Nov. 4, 1941.                 G. B. BAILEY                 2,261,670
           CONTROL MEANS FOR INTERNAL COMBUSTION ENGINES
              Original Filed April 8, 1935    2 Sheets-Sheet 1

Inventor
George B. Bailey
Harry Dexter Pick
Attorney

Nov. 4, 1941.  G. B. BAILEY  2,261,670
CONTROL MEANS FOR INTERNAL COMBUSTION ENGINES
Original Filed April 8, 1935   2 Sheets-Sheet 2

INVENTOR
George B. Bailey
ATTORNEY

Patented Nov. 4, 1941

2,261,670

UNITED STATES PATENT OFFICE 2,261,670

CONTROL MEANS FOR INTERNAL COMBUSTION ENGINES

George B. Bailey, Sharon, Mass., assignor to Thermal Engineering Company, Boston, Mass., a corporation of Massachusetts Original application April 8, 1935, Serial No. 15,166, now Patent No. 2,142,102, dated January 3, 1939. Divided and this application December 30, 1938, Serial No. 248,365

8 Claims. (Cl. 60—97)

This invention relates to improvements in control means for internal combustion engines. This application is a division of application Serial No. 15,166 filed April 8, 1935 by myself and Edward G. Jay jointly, entitled Power generating engine and controlling means therefor, which application issued on January 3, 1939 as Letters Patent No. 2,142,102.

Broadly considered my invention is directed to means for automatically controlling the operation of an internal combustion engine in accordance with variations in the temperature of the exhaust gases of another internal combustion engine, or in accordance with variations in other conditions having a direct or proportional relation to the torque being developed by said other engine.

It is an important object of my invention when applied to an internal combustion engine, for example to one of the Diesel type, to control the governor adjustment of that engine by means of thermostatic means responsive to the temperature of the exhaust gases of another such engine, to the end that the controlled engine shall not only be started and stopped automatically by my improved control means but its performance regulated automatically while it is in operation.

A further object is to provide for coupling two or more internal combustion engines together in such manner and by such means as to prevent overloading of any engine and bring into load-carrying relation one or more of the other engines as the need for it occurs.

A further object of the invention is the provision of a simple and efficient mechanism for coupling together and controlling automatically the operation of internal combustion engines or other prime movers in accordance with the power demand of the system by means of control mechanism responsive in effect to the torque exerted by one and then another of the engines for controlling the governor instrumentalities of the several prime movers.

It is also an important feature of the invention to utilize a multiplicity of internal combustion engines with means automatically actuated during the operation of one engine to start, operate and control an adjacent engine or successive engine during predetermined times in the operation of the first engine as reflected by the horsepower developed or torque exerted by said engine. Preferably, I utilize the varying temperature of the exhaust of one engine which reflects the torque exerted or horsepower developed by that engine to control the coupling and power input of an adjacent engine dependent upon the load requirements and similarly, a third engine by the second, and so on.

Other objects and advantages of the invention will appear from the following detailed description and appended drawings of certain forms of the invention shown as applied to internal combustion engines for driving electrical generating units, although it is to be understood that the application and use of the control means shown and described are not limited in their operation to utilization with electric generators but may be employed in connection with any other suitable types of power driven mechanisms.

An advantage of my invention is that it makes possible the coupling up in operation, electrically or mechanically, of any number of internal combustion engine driven power units at the same time providing full automatic control. This results in saving in first cost because of application of standardized high speed units of low cost, saving in operating cost due to the elimination of attendants, and increased efficiency, minimizing the chance of complete failure in a multiple unit application, etc.

Heretofore it has been common practice to divide the load between the various prime movers when operating cooperatively in parallel, depending entirely upon the individual engine governor mechanism to keep the load divided and to manually adjust said governing mechanism in the event of a tendency of one prime mover to assume more or less than its share of the load. This has resulted in a constantly varying speed, with varying load conditions, and relatively inefficient operation under low load conditions. By my invention each prime mover is loaded up to the point of maximum efficient operation before additional prime mover capacity is brought into action, with the result that in a multiple unit plant every unit is operating at a point of maximum efficiency except the last unit brought into operation which assumes any variation in the load. This results in maximum efficient operation and at the same time constant speed, pressure or voltage characteristics.

By the use of varying temperature from one engine, which is quickly responsive to the increased load carried by such engine, particularly in hydro-carbon engines of the Diesel engine type, I can secure a substantially immediate action through the operation of the thermostat and electrical connections to start, to operate, and to couple one or more engines in a power plant to the electrical generating equipment in response to the load requirement.

It is common knowledge that the temperature of the exhaust gases of a combustion engine gives a direct indication of the power which it is delivering. In the case of a Diesel engine, exhaust temperatures will vary approximately from 350° F. at no load to 700° F. at full load and up to about 1100° F. at 25% overload. Of course, the exhaust temperature may go even higher than 1100° F. but ordinarily beyond that temperature no additional power can be generated because the injection pumps are limited in their capacity to injecting only fuel sufficient to provide power for a 25% overload which, as stated, corresponds to an exhaust temperature of around 1100° F. There is no especial harm in operating a Diesel engine momentarily or even for a short period under an overload not exceeding 25%, but continued operation under such an overload would involve an excessive maintenance expense. When a Diesel engine is driving an electric generator, the exhaust temperature will give an immediate indication of the electrical energy being delivered by the generator or the current demand on the electrical circuit. As the electrical demand increases, exhaust temperature will also increase.

Also, it is a well-known fact that at a constant speed the efficiency of a Diesel engine will drop off as the load decreases. Therefore, in a Diesel engine driven electric plant comprising two or more units, as the load varies the various units are thrown in and out of operation in order to maintain as nearly as possible maximum efficient output of the units in operation. Furthermore, this saves considerably in the wear and tear on the equipment which, of course, is directly proportional to the number of hours of use.

My present improved method and apparatus is of particular importance in enabling the utilization of a multiplicity of combustion engines to electrical generating equipment, with each engine or group of engines arranged to be "cut in" for operative actuation on the electrical generating equipment in direct response to the varying power requirements on the electrical generating unit.

Preferably I arrange the plurality of combustion engines to operate on the electrical generating equipment through an automatic clutch, thus permitting constant rotation of the generator, or generators, in one direction at all times so that at least one engine is operating through the overriding of the clutch connections with the idle engines, while also permitting instant actuation as soon as an additional engine is cut into operation and the same will pick up a proportionate load through its clutch connections.

Furthermore, several such combinations or systems can be operating in parallel, that is a plurality of generators being driven by their respective engines, or engine, through overriding clutches would be coupled together electrically and would keep running even though their respective prime movers may be shut down.

In carrying out my present invention and by utilizing standard apparatus, so far as practical, incorporating my novel method, I have illustrated in the accompanying drawings an electrical generating equipment employing a plurality of power units of the Diesel combustion engine type, wherein one combustion engine is arranged for operation to drive the generator up to a load and speed for best efficiency of such engine, say 70 to 80% of capacity; and thereupon to automatically start, operate, and couple an adjacent engine through the actuation of a thermostat arranged in heat-receiving relation with the exhaust of the first engine and suitable electrical connections to start and operate the second engine. The clutch connections afford automatic means for coupling the power input of the second unit so that when it has attained speed it will pick up a proportional amount of load on the generator.

Successive power units would be similarly cut in, and I have herein illustrated a group of four such power units in addition to a double engine power plant, but it will be understood that any number or series of groups of combustion engines might be utilized.

This feature is of great importance, permitting the installation of the desired power plant made up of a plurality of relatively small and efficient units; thus a 300 H. P. Diesel engine, by my invention, may be coupled with a set of three others and produce a 1200 H. P. plant, affording great economy in mass production, handling and shipping, as well as simplifying installation and repairs.

Referring to the drawings illustrating preferred embodiments of the invention,

Fig. 4 is an enlarged detail.

Figure 1:
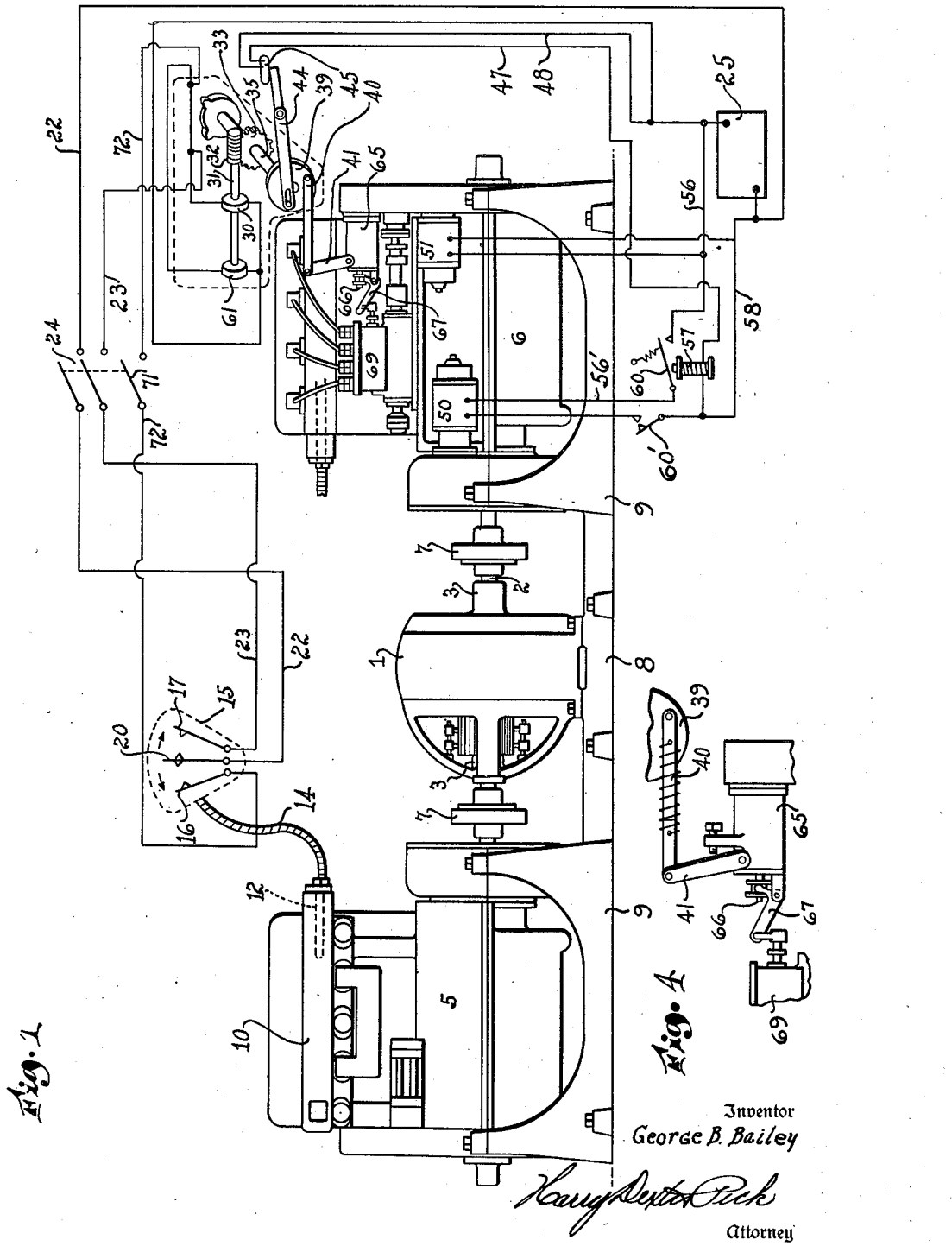
Fig. 1 is a diagrammatic view illustrating a plurality of two internal combustion engines in operative connection in accordance with my invention as an electrical generating power plant.

Referring to Fig. 1, wherein I have illustrated in diagrammatic form a typical embodiment of my present invention, an electrical generating plant is indicated at 1 which has the generator mounted upon an axle 2 in suitable bearings 3—3, with a pair of internal combustion engines 5 and 6 mounted respectively at either side of the generator 1 and in alignment with the shaft 2, and coupled to the shaft 2 by clutches as indicated generally at 7—7.

These clutches may be any suitable and typical type of one-way clutches, over-riding or other automatic clutch power transmission devices. Suitable supports 8 for the generator 1 and 9—9 for the engines 5 and 6 are shown diagrammatically.

In the system illustrated in Fig. 1, I have designated the engine 5 as the prime mover, this being a typical internal combustion engine, preferably of the Diesel type, and with an exhaust manifold 10 in which is a temperature receiving thermostat 12, having conducting wires leading through a conduit 14 to an electrical switch 15. Thus, for example, if the governor of engine 5 is set for a range of engine speeds from say about 1160 R. P. M. at no load to about 1240 R. P. M. at full load, corresponding to a normal operating generator speed of 1200 R. P. M., it may be desired to limit the load on engine 5 so that the temperature of the exhaust will normally be within a range from 480° F. to 620°. For such a range the contact points 16 and 17 of the thermostatic switch 15 are set for 480° and 620°, respectively. The moving contact member 20 being responsive to the thermostat 12 in the exhaust manifold 10 makes and breaks at the contacts 16 and 17 when said temperatures respectively occur.

Thus, upon the switch 15 being closed, as, for example, when the contacts 20 and 17 are in electrical connection, the conducting wires 22 and 23 operating through the switch 24, which may be left closed, and taking power from the battery 25 will actuate the motor designated at 30 to turn the shaft 31 and, hence, through the worm 32 and gear 33 to rotate the shaft 35. This rotation of shaft 35, and crank wheel 39 will cause lever 44 to rock and tilt a Mercoid switch 45 to close a circuit between wire 48 connected to one terminal of the battery 25 and a wire 47 leading to a solenoid 57 which in turn is connected to the other terminal of the battery through wire 58 running thence from the starter 50. The energization of the solenoid 57 effects closure of switch 60 and thus establishes the circuit from battery 25, through wire 56, closed switch 60 wire 56', starter 50 and wire 58 (hand switch 60' being closed) back to the battery. This will cause the starter to turn over engine 6.

In the meantime, motor 30 and its associated mechanism including the link 40 and governor adjustment lever 41 will adjust the governor 65 to a full speed position which, through plunger 66, and bell crank lever 67, puts rack of injection pump 69 in full open position and, therefore, the engine 6 will start.

Figure 2:
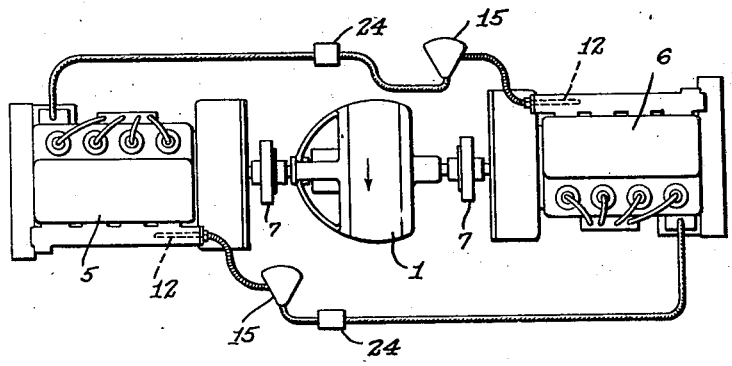
Fig. 2 is a plan view on a reduced scale of the two engines of Fig. 1.
Figure 3:
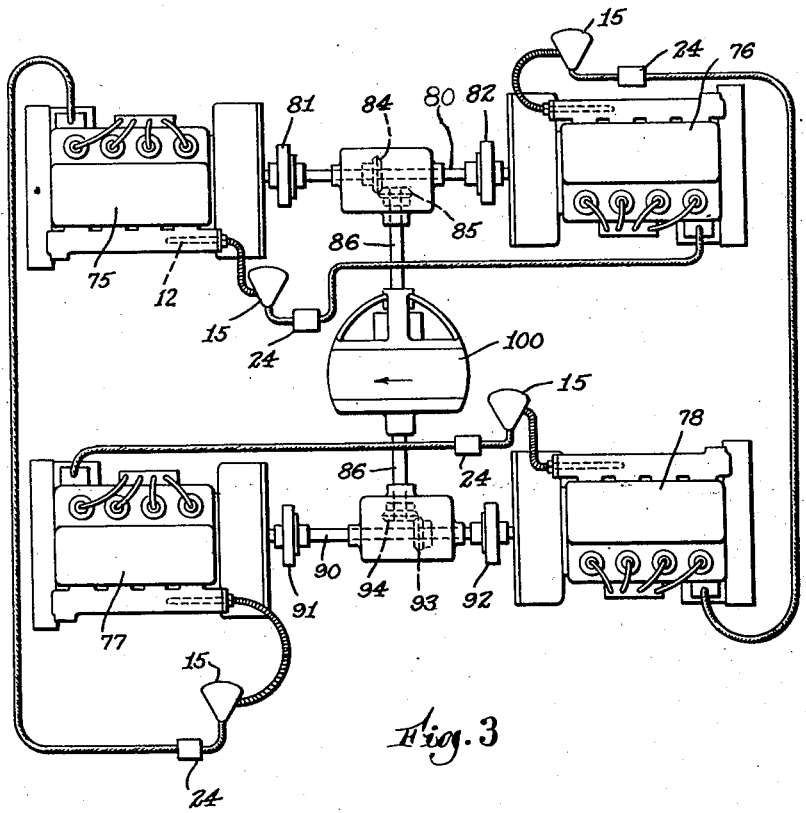
Fig. 3 is a diagrammatic view of four internal combustion engines operating in accordance with my invention in an electrical power generating system.

For the purpose of simplifying the diagrammatic illustrations contained in Figs. 2 and 3 of the drawings, the electric circuits and various control instrumentalities shown in Fig. 1 as located between the switch 24 and the engine 6 may be shown diagrammatically in the form of a cable and designated by the reference character 14'.

Once the engine 6 is in full operation it will, through one-way clutch 7, pick up a share of the load and cooperate with engine 5 to drive generator 1. However, as soon as a share of the load is taken off of engine 5 the exhaust temperature of engine 5 drops, resulting in breaking the circuit of contact 20 with contact 17 and making the circuit of contacts 20 and 16, thus closing the circuit through wires 72 and 22, the switch 71 being closed, and operating reverse motor 61 to retard the governor speed adjustment and, therefore, reduce the torque exerted by engine 6. As the torque exerted by engine 6 is reduced more of the load is again assumed by engine 5, again resulting in an increase in the exhaust temperature of engine 5. In this way, moving contact 20 will float back and forth between contacts 17 and 20 on variation in the exhaust temperature between 580° and 620°, with the result that engine 6 will assume the variation in the load with the load on, or torque exerted by engine 5 remaining substantially constant.

This will continue just so long as the load on the generator is in excess of the capacity of engine 5 corresponding to an exhaust temperature of 480° to 620°. However, if the load drops so that the exhaust temperature of engine 5 drops below 480° reverse motor 61 will continue to retard the governor adjustment of governor 65 until it reaches the stop position. At the stop or full retarded position injection pump 69 will cease injection and engine 6 will stop.

In Fig. 3 I have illustrated a plurality of four such engines, here designated in diagrammatic form as 75, 76, 77, and 78 with the exhaust thermostat 12 of the engine 75 operating through a duplicate switch 15 to actuate the engine 76, these two engines 75 and 76 being coupled on a single shaft 80 through clutches 81 and 82 and through bevelled gears 84 and 85 arranged to turn the armature shaft 86 of the generator 100. Similarly, from the engine 76 the engine 78 may be cut in and from the engine 78 the engine 77 may be cut in, these latter two operating in unison through similar clutches 91 and 92 on the shaft 90, with bevelled gears 93 and 94 coupling the same to the armature shaft 86, thus turning the generator 100 and coupling four engines to take care of the load requirements up to the combined capacity of the total number of engines coupled on the shaft 86. A further series of engines could be arranged operating through similar or corresponding bevelled gears to give a large number of separate engines all interconnected and automatically cut in and cut out as the load requirements on the generator varies.

It is to be understood that in the form of the invention shown in Figs. 1 and 2, as well as in the form shown in Fig. 3, the temperature of the exhaust gases bears a distinct relation to the torque developed on the drive shaft or the power delivery ratio of the engine, that is, the ratio of the power actually delivered to the capacity of the engine. The term "power delivery component" of an engine or engines as employed herein is intended to designate that portion or part of the total power being delivered by the system which is being delivered by the engine or engines in question.

In Fig. 2 of the drawings a thermostatic control means is represented diagrammatically which includes cables 14 and 14' having switches 15 and 24 located therein connecting the engine 5 with the engine 6, and a similar connection is shown as extending from the engine 6 back to the engine 5. In a similar manner, as shown in Fig. 3, engines 75, 76, 78 and 77 are connected in the order named and a similar connection is shown as extending between adjacent engines of the series and from the engine 77 back to engine 75. The purpose of this showing is to provide a closed series, whereby any one of the engines may be made the leading or continuously operating engine of the series as may be desired. As shown in Fig. 3, for example, where engine 75 is the leading engine, the switch 24 in the connection from engine 77 back to engine 75 would be opened to cut out any influence back on engine 75 when the engines are operated in series. As a matter of fact, however, this opening of the switch 24 would be unnecessary, since the only result from leaving this switch 24 closed when all engines are operated would be to tend to increase the governor speed position of engine 75, which is already at full speed when all the other engines are operating.

I claim:

1. A power installation comprising two or more power units of the internal combustion type, means interconnecting said units for supplying power therefrom to a common load, and means operable in accordance with variations in temperature of the products of combustion from one or more of said units for changing the power delivery components of one or more of the remaining units.

2. A power installation comprising two or more internal combustion engines, means interconnecting said engines for supplying power therefrom to a common load, a control means operated by one of said engines at a predetermined point in the load-capacity of said engine, and governor means actuated by said control means for regulating the operation of one or more of the remaining engines in accordance with the torque developed by said first engine.

3. A power installation comprising two or more internal combustion engines, means interconnecting said engines for supplying power therefrom to a common load, control means actuated by one of said engines at a predetermined point in the exhaust temperature thereof, and governor means actuated by said control means for regulating the fuel supply to one or more of the remaining engines in accordance with the torque developed by said first engine after actuation of said governor means by said control means.

4. A power installation comprising two or more internal combustion engines of the Diesel type, a common engine driven means, means interconnecting said engine for supplying power therefrom to said common engine driven means, a thermostat operated control means actuated by one of said engines at a predetermined point in the exhaust temperature range of said engine, and governor means actuated by said control means for regulating the operation of one or more of the remaining engines in accordance with the exhaust temperature of said first engine after actuation of said control means.

5. A power installation comprising two or more internal combustion engines, means interconnecting said engines for supplying power to a common load, a thermostat control means operable at a predetermined exhaust temperature of one of said engines, governor means actuable by said control means for initiating control of the operation of one or more of the remaining engines, said governor means being regulated by the exhaust temperature of said first engine after being brought into operation by said control means.

6. A power installation comprising a series of two or more internal combustion engines, means interconnecting said engines to a common load, control means associated with each engine and responsive to the load thereon, governor adjustment means on each engine of the series, and means connecting successively the said control means of one engine with the governor adjustment means of the next engine of the series whereby the operation of said next engine is controlled in accordance with the load on the engine preceding it in the said series.

7. A power installation comprising a series of two or more internal combustion engines interconnected for supplying power to a common load, thermostatic control means associated with each engine and responsive to the exhaust temperature thereof, governor adjustment means associated with each engine, and means interconnecting the thermostatic actuated control means of one engine with the governor control means of another engine of the series whereby the operation of said other engine is controlled in accordance with the exhaust temperature of the first said engine of the series.

8. A power installation comprising a series of two or more internal combustion engines, means interconnecting said engines to a common load, and thermostatic means operating in accordance with the exhaust temperature of each of said internal combustion engines for controlling the power delivery of an adjacent engine in the series and in series as the load requires, with the exhaust temperature of one engine controlling the second engine, the exhaust temperature of a second engine controlling a third engine, and so on.

GEORGE B. BAILEY.